United States Patent
Bux

(10) Patent No.: US 10,060,735 B2
(45) Date of Patent: Aug. 28, 2018

(54) CHASSIS MEASUREMENT UNDER AMBIENT LIGHT

(71) Applicant: Robert Bosch GmbH, Stuttgart (DE)

(72) Inventor: Hermann Bux, Adelzhausen (DE)

(73) Assignee: Robert Bosch GmbH, Stuttgart, DE (US)

( * ) Notice: Subject to any disclaimer, the term of this patent is extended or adjusted under 35 U.S.C. 154(b) by 204 days.

(21) Appl. No.: 15/023,989

(22) PCT Filed: Sep. 11, 2014

(86) PCT No.: PCT/EP2014/069426
§ 371 (c)(1),
(2) Date: Mar. 22, 2016

(87) PCT Pub. No.: WO2015/043978
PCT Pub. Date: Apr. 2, 2015

(65) Prior Publication Data
US 2016/0231107 A1    Aug. 11, 2016

(30) Foreign Application Priority Data

Sep. 26, 2013  (DE) .................. 10 2013 219 462

(51) Int. Cl.
*G01C 3/08* (2006.01)
*G01B 11/275* (2006.01)
*G06T 7/73* (2017.01)

(52) U.S. Cl.
CPC ............ *G01B 11/2755* (2013.01); *G06T 7/73* (2017.01); *G01B 2210/14* (2013.01);
(Continued)

(58) Field of Classification Search
CPC .......... G01B 11/2755; G01B 2210/143; G01B 2210/30; G01B 2210/14; G06T 7/73; G06T 2207/20204
(Continued)

(56) References Cited

U.S. PATENT DOCUMENTS

| | | | |
|---|---|---|---|
| 6,064,750 A | 5/2000 | January et al. | |
| 7,454,841 B2 * | 11/2008 | Burns, Jr. .......... | G01B 11/2509 33/203.18 |

(Continued)

FOREIGN PATENT DOCUMENTS

| | | |
|---|---|---|
| CN | 102150011 A | 8/2011 |
| CN | 102859321 A | 1/2013 |

(Continued)

OTHER PUBLICATIONS

International Search Report corresponding to PCT Application No. PCT/EP2014/069426, dated Dec. 4, 2014 (German and English language document) (7 pages).

*Primary Examiner* — Mark Hellner
(74) *Attorney, Agent, or Firm* — Maginot, Moore & Beck LLP

(57) ABSTRACT

A device for vehicle measurement, in particular for determining the angular position of at least one wheel of a vehicle, includes at least one measuring device having at least one image recording device configured to record images. The recorded images contain the image of at least one mark which has a fixed geometric relationship to a wheel of the vehicle. The device for vehicle measurement further includes at least one evaluation unit configured to evaluate the images recorded by the at least one measuring device. The evaluation unit is further configured to evaluate
(Continued)

the intensity of illumination of a background area surrounding the respective mark in addition to imaging the at least one mark.

14 Claims, 4 Drawing Sheets

(52) U.S. Cl.
CPC .... *G01B 2210/143* (2013.01); *G01B 2210/30* (2013.01); *G06T 2207/20204* (2013.01)

(58) Field of Classification Search
USPC ........................................................ 356/4.01
See application file for complete search history.

(56) References Cited

U.S. PATENT DOCUMENTS

| | | |
|---|---|---|
| 2004/0246470 A1 | 12/2004 | Burns et al. |
| 2005/0126021 A1* | 6/2005 | Robb ........................ G06T 7/70 |
| | | 33/288 |
| 2007/0124949 A1 | 6/2007 | Burns, Jr. et al. |
| 2010/0037473 A1* | 2/2010 | Schommer ......... G01B 11/2755 |
| | | 33/228 |
| 2013/0050710 A1 | 2/2013 | Yamaguchi et al. |

FOREIGN PATENT DOCUMENTS

| | | |
|---|---|---|
| DE | 10 2008 042 024 A1 | 3/2010 |
| DE | 10 2009 029 241 A1 | 4/2010 |
| DE | 10 2010 039 246 A1 | 2/2012 |

\* cited by examiner

CHASSIS MEASUREMENT UNDER AMBIENT LIGHT

This application is a 35 U.S.C. § 371 National Stage Application of PCT/EP2014/069426, filed on Sep. 11, 2014, which claims the benefit of priority to Serial No. DE 10 2013 219 462.5, filed on Sep. 26, 2013 in Germany, the disclosures of which are incorporated herein by reference in their entirety.

The present disclosure relates to a device and a method for chassis measurement, in particular for measuring the position of the wheels of motor and commercial vehicles, under ambient light, in particular without artificial illumination.

BACKGROUND

In the previously known devices for measuring the position of motor vehicle wheels, as are known from e.g. DE 10 2010 039 246 A1 and DE 10 2009 029 241 A1, measurement objects provided with measurement marks, so-called targets, are fastened to the wheels of the vehicle with the aid of special adapters. The targets attached to the wheels are artificially illuminated by an illumination device by way of light flashes or continuous light and images of the targets are recorded by cameras (usually 3D stereo cameras). The positions of the targets, and hence also the positions of the wheels, in space are established using special image processing algorithms, such as e.g. contour analysis, ellipse fitting or centroid determination for the marks on the targets (see e.g. DE 10 2008 042 024 A1). The influences of changing ambient light are largely eliminated by the artificial illumination of the targets during the measurement.

The artificial illumination of the objects to be measured leads to higher manufacturing costs of the measuring installation due to an additional hardware-technological outlay in terms of light-emitting diodes, lasers, lamps and/or projectors.

In order to improve the used/interference light ratio between the artificial illumination and the ambient light, the marks on the targets are often made from a reflecting film or from reflecting dye (retroreflective marks), which has as a consequence higher manufacturing costs in relation to a target printed with a normal dye.

It is therefore an object of the disclosure to provide a cost-effective device and a cost-effective method for measuring vehicles, in which, in particular, it is possible to dispense with artificial illumination and retroreflective marks.

SUMMARY

A method according to the disclosure for measuring vehicles, in particular for establishing the angular position of at least one wheel of a vehicle, comprises the following steps: recording images, wherein the recorded images contain the image of at least one mark which has a fixed geometric relationship to at least one wheel of the vehicle; and evaluating the images recorded by the at least one measuring device, wherein the evaluation of the images also comprises evaluating the illumination intensity of a background region surrounding the respective mark in addition to the images of the at least one mark.

A device according to the disclosure for measuring vehicles, in particular for establishing the angular position of at least one wheel of a vehicle, has at least one measuring device with at least one image recording device embodied to record images, wherein the recorded images contain the image of at least one mark which has a fixed geometric relationship to at least one wheel of the vehicle; and an evaluation unit embodied to evaluate the images recorded by the at least one measuring device and in the process also to evaluate the illumination intensity of a background region surrounding the respective mark in addition to the image of the at least one mark.

A problem when measuring under ambient light, i.e. without defined artificial illumination, is that the illumination situation of the marks on the wheel only depends on the changing and often uncontrollable ambient light conditions.

Although the basic brightness of the image recording can be modified by way of the stop setting and/or by way of the exposure time of the camera, which is sufficient for evaluating an approximately homogeneously illuminated target, the targets are often illuminated in an inhomogeneous fashion in practice, for example as a result of partial solar irradiation, i.e. part of a target is exposed to direct light irradiation while another part of the target lies in the shadow. Therefore, depending on the setting of the camera stop and the exposure time, there are normally exposed regions and overexposed or underexposed regions within the recorded image at the same time.

Greatly underexposed regions within the target cannot be evaluated since the marks in these regions are not sufficiently visible.

Overexposed regions lead to the edges of the marks in the image being displaced as a result of overdrive effects of the camera (e.g. the so-called "blooming effect") or different illumination intensities within the image recording and/or to a grayscale profile required for edge detection no longer being present in the overexposed region, leading to errors in the evaluation. Moreover, the information in relation to the intensity distribution within the mark is lost in the overexposed region of the marks.

Finding the targets within the image constitutes a further problem when measuring under ambient light. In the case of methods with artificial illumination and retroreflective marks, the background of the targets is largely masked, making it substantially easier to find the marks in the image. In contrast thereto, in the case of measuring under ambient light, the targets need to be found within, and extracted from, an image with a very complicated content that is comparable to a photograph.

These problems are solved by a method according to the disclosure for evaluating the recorded images of the targets and by a device carrying out a method according to the disclosure.

In order to avoid measurement errors, only the images of marks which are either "normally" exposed in a homogeneous fashion or overexposed in a homogeneous fashion in the recorded image are evaluated by the image processing in a first embodiment of a method according to the disclosure. By contrast, marks which are exposed in an inhomogeneous fashion, in particular marks which lie at a light/shadow boundary, are excluded from the evaluation since the contour and/or the optical centroid thereof is/are shifted by the above-described camera effects and the irregular illumination. In order to determine the marks which are suitable for an evaluation of chassis measurement, the direct ambient brightness of the individual mark is analyzed and evaluated.

When applying this exclusion method, it is expedient for the greatest number of marks possible to be formed on the targets so that a sufficient number of marks with homogeneous exposure or homogeneous overexposure remain for the further evaluation, even after excluding the marks exposed in an inhomogeneous fashion. By contrast, a single large mark, e.g. a ring target, would no longer be evaluable without errors in the case of a single light/shadow profile on the target.

It is for this reason that targets with the largest possible number of marks are preferably used in this method. The design of the targets and the number of marks depend largely on the measurement problem. Here, a compromise needs to be made between a number of marks (e.g. points) that is as large as possible and the resolution (identifiability) of the marks themselves in the case of overexposure or underexposure. Moreover, the marks need to have a sufficient spacing from one another so that the background intensity can also be analyzed and evaluated in the direct vicinity of the marks.

In a second embodiment, the images of marks illuminated in an inhomogeneous fashion are also included in the evaluation. To this end, the intensity distribution of the marks is reconstructed by calculation in a manner dependent on the intensity distribution of the mark background.

In this second embodiment, all visible marks can be reconstructed in a manner dependent on the background intensity of the region surrounding them and included in the evaluation, with the information about the intensity distribution missing within the overexposed regions of the marks being complemented by calculation by way of the intensity distribution of the directly adjacent surroundings. As a result, the contour and the optical centroid are corrected in such a way that these substantially correspond to the values of a correctly exposed mark.

The second embodiment has the following advantages:
compared to the exclusion principle of the first embodiment, more marks are evaluated overall in the case of the same target, which in turn increases the measurement accuracy.

Fewer but instead larger marks can be used in the case of an unchanging size of the target, which likewise contributes to an improvement in the measurement accuracy due to the better resolution of the marks in the image.

In the case of the same mark size, the number of marks can be reduced in relation to the exclusion method, and so the targets can have a smaller, lighter and more cost-effective embodiment.

For the purposes of reconstructing the marks, it is possible to use not only the direct intensity of the surrounding background itself, but also the curve profile of the intensity, proceeding from the background up to the overexposure limit of the mark.

In one embodiment, provision is made for at least one measurement target assemblable at a wheel of the vehicle, wherein at least one mark is formed on the at least one measurement target. Assemblable measurement targets constitute simple and cost-effective means for providing the measurement marks required for measuring vehicles.

In one embodiment, the at least one mark on the at least one measurement target is embodied with a matt, diffusely reflecting color and/or with a matt, diffusely reflecting surface structure. Such marks can be produced in a particularly cost-effective manner, in particular more cost-effectively than retroreflective marks.

In one embodiment, provision is made for at least one optical projection device embodied to project at least one mark onto the vehicle, in particular onto at least one wheel of the vehicle. In this way, it is possible to generate marks on the wheel of the vehicle in a simple and convenient manner, and the outlay connected with assembling and disassembling measurement targets assemblable at the tires can be avoided. Overall, the vehicle measurement can be carried out in a quicker and more cost-effective manner.

In one embodiment, at least one mark has an optically pronounced boundary. An optically pronounced boundary of the mark makes it easier for the algorithm for evaluating the images recorded by the at least one measuring device to uniquely identify the marks within the image.

In one embodiment, the method comprises analyzing the illumination intensity of at least one first recorded image and recording at least one further image, wherein the exposure time and/or stop are/is adapted in such a way when recording the at least one further image that the greatest possible number of marks is visible and evaluable in the at least one further recorded image. In this way, the number of marks available for the evaluation can be increased and, consequently, the quality of the results of the vehicle measurement can be improved.

BRIEF DESCRIPTION OF THE DRAWINGS

Below, the disclosure is explained in more detail on the basis of the attached figures; here.

DETAILED DESCRIPTION

An exemplary embodiment of the disclosure will be described below with reference to the attached figures.

Figure 1:
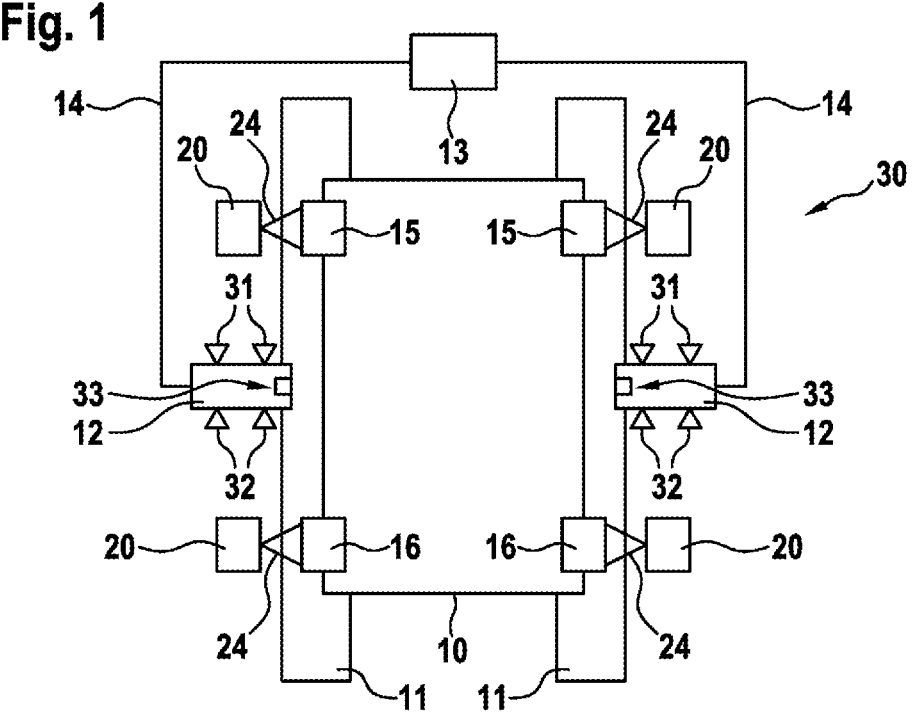
FIG. 1 shows a plan view of a first exemplary embodiment of a device according to the disclosure for measuring vehicles.
Figure 2:
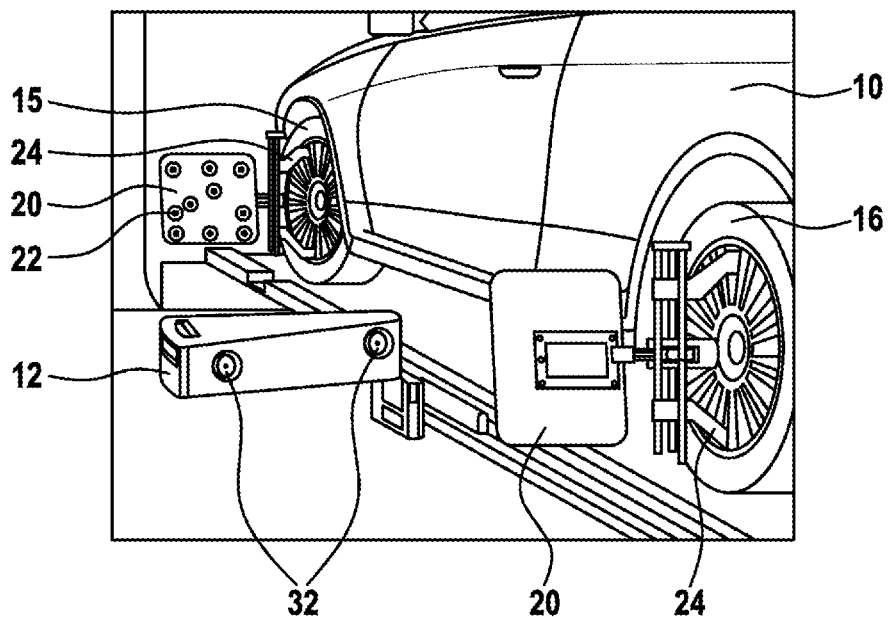
FIG. 2 shows a perspective side view of the device for measuring vehicles shown in FIG. 1.

FIGS. 1 and 2 respectively show a device 30 for measuring vehicles, with a measuring system and a vehicle 10 on a car lift with two driving tracks 11 in a plan view (FIG. 1) and a lateral view (FIG. 2).

Measurement boards ("targets") 20 are fastened in each case to an associated vehicle wheel 15, 16 with the aid of adapters 24. The measurement boards 20 have a substantially planar surface which is aligned substantially at right angles to the longitudinal extent of the vehicle 10 and on which marks 22 are embodied as optically registrable marks (measurement marks).

The measuring device 30 also comprises two image recording apparatuses 12 with, in each case, four measuring cameras 31, 32 and with, in each case, a referencing apparatus 33 and an evaluation unit 13, which has at least one computer and storage unit, inter alia for working through image processing software.

The two image recording apparatuses 12 are arranged laterally in relation to the two driving tracks 11 in each case and connected to the evaluation unit 13, which is embodied for data processing, by way of data lines 14 or in a wireless fashion. The two image recording apparatuses 12 are equipped in each case with two stereo camera systems, which are formed by in each case two measurement cameras 31, 32. The stereo camera systems aligned toward the front, with the measurement cameras 31, detect the measurement boards 20 arranged at the front wheels 15. The stereo camera systems aligned toward the back, with the two measurement cameras 32, detect the measurement boards 20 arranged at the rear wheels 16. Each image recording apparatus 12 furthermore comprises the referencing apparatus 33. In the depicted measurement system, the two image recording apparatuses 12 are aligned in such a way that the two referencing apparatuses 33 face one another such that a measurement space reference system for the image recording apparatuses 12, which is transmitted to the evaluation unit 13, can be set by a referencing process.

In an alternative exemplary embodiment not shown in the figures, each image recording apparatus 12 and/or each one of the measurement cameras 31, 32 and each referencing apparatus 33 can have, instead of a central evaluation unit 13, a dedicated computer and storage unit which serves as evaluation unit 13, with the individual evaluation units then being connected to one another for data interchange purposes.

The images of the measurement boards 20 can be recorded in the case of a stationary vehicle 10 or when the vehicle 10 moves. The location and angular positions of the respective vehicle wheels 15, 16 in space are calculated from the image recordings using special algorithms in the evaluation unit 13 and the chassis geometry is calculated based thereon.

An example for a possible method for measuring vehicles with the measurement system depicted in FIGS. 1 and 2 is described in DE 10 2008 042 024 A1.

Figure 3:
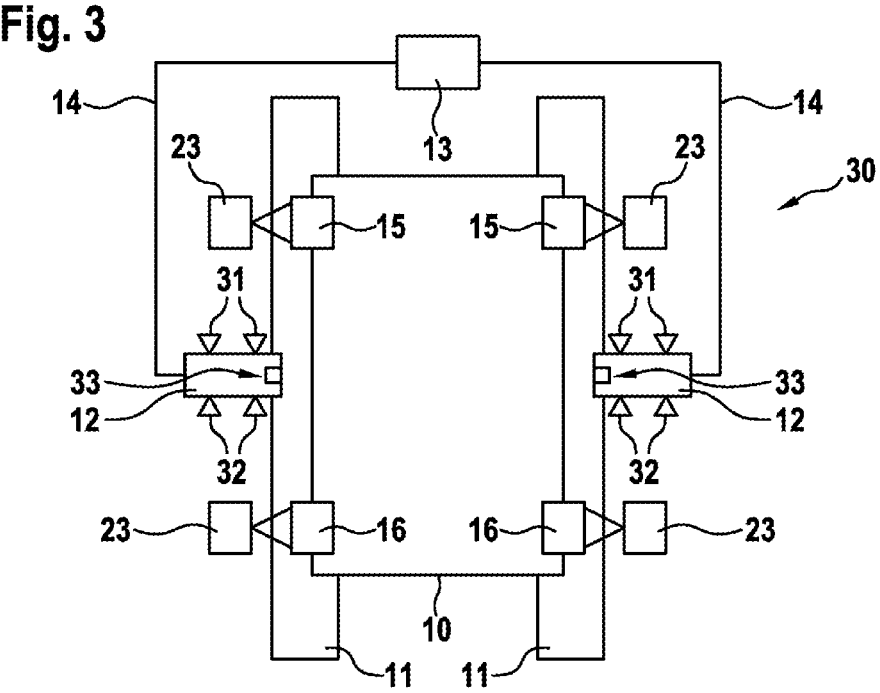
FIG. 3 shows a plan view of a second exemplary embodiment of a device according to the disclosure for measuring vehicles.

Instead of the measurement boards 20 provided with the marks 22, or in addition thereto, provision can also be made for at least one projection device 23 embodied to project at least one optical mark onto the vehicle 10, in particular onto at least one wheel 15, 16 of the vehicle, as shown in FIG. 3. In this case, the cameras 31, 32 are aligned in a suitable fashion in order to be able to record images of the marks projected by the projection device 23 onto the wheels 15, 16. The further features of the device 30 shown in FIG. 3 correspond to the features shown in FIGS. 1 and 2; therefore, these are provided with the same reference symbols and not described once again in detail.

Figure 4:
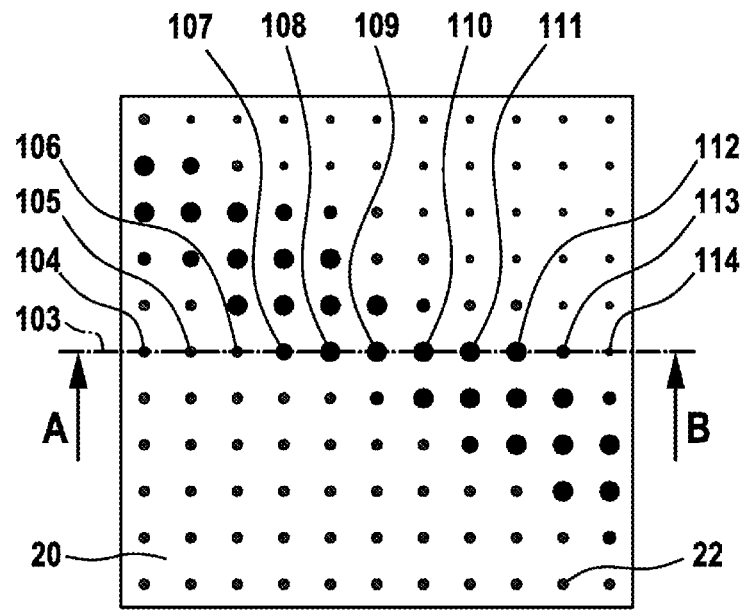
FIG. 4 shows an image recording of a target with marks in ambient brightness.

FIG. 4 shows, in an exemplary manner, the image of a measurement board 20 with marks 22 recorded under ambient brightness, with the measurement board 20 being illuminated in an inhomogeneous fashion by partial solar irradiation. A cut line A-B 103 which extends through the marks 104-114 is plotted in the image of the measurement board 20.

Figure 5:
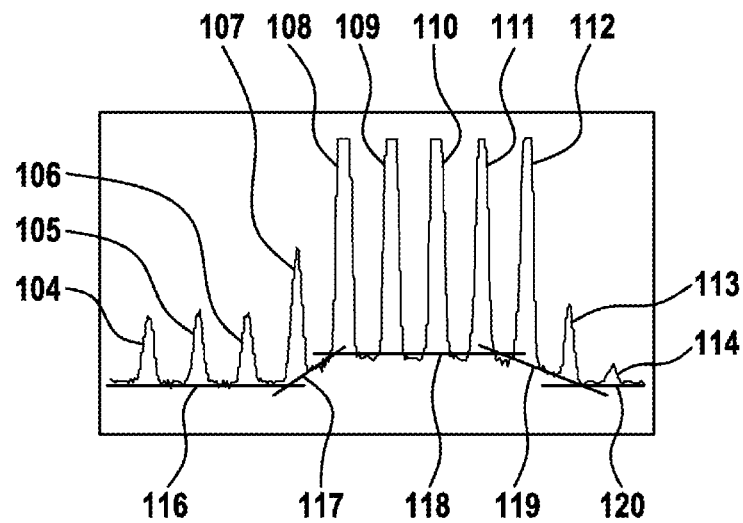
FIG. 5 shows the intensity profile along the cut line A-B from FIG. 4.

FIG. 5 shows the intensity profile along the cut line A-B from FIG. 4 over the marks 104-114 as a two-dimensional diagram (histogram).

The straight lines 116, 117, 118, 119 and 120 plotted in the histogram shown in FIG. 5 elucidate, to a linear approximation, gradients of the background intensity in the region of the respective mark 104-114.

What can clearly be seen from the example shown in FIGS. 4 and 5 is that the marks 108, 109, 110 and 111 within the region of the solar irradiation are depicted to be larger than the marks in the regions of indirect illumination as a result of the higher intensity and the overexposure effects of the camera 31, 32. However, the overexposed marks 108, 109, 110, 111 also keep the contour and the optical centroid thereof, as they are largely overexposed in a uniform fashion. Therefore, the overexposed marks 108, 109, 110, 111 can also be used for the subsequent evaluation for chassis measurement.

By contrast, the optical centroid of the image of the marks 107, 112 and 113, which are situated in the direct transition region between the region of solar irradiation and the shadow, is displaced as the intensity maximum of the images of the marks 107, 112, 113 is no longer situated at the center of the respective mark 107, 112, 113 due to the non-uniform illumination. This effect causes an error in evaluation methods with a contour or intensity centroid analysis of the marks.

This effect can clearly be identified in the histogram shown in FIG. 5:

What can be identified in the case of the marks 104, 105, 106, 108, 109, 110, 111 and 114 is that the respectively associated straight lines 116, 118, 120 of the background intensity are virtually horizontal, i.e. the gradients of the background intensity are virtually zero. Therefore, the marks 104, 105, 106, 108, 109, 110, 111, 114 can be included in the evaluation, even though the images of the marks 108, 109, 110 and 111 are overexposed.

By contrast, in the images of the marks 107, 112 and 113, the associated straight lines 117 and 119 are increasing and falling, i.e. the gradients thereof are unequal to zero. Therefore, the optical centroid of the image of the marks 107, 112, 113 is displaced due to the non-uniform illumination. In particular, this applies to the mark 112 which, additionally, is also overexposed. Therefore, the marks 107, 112 and 113 are not taken into account in the evaluation.

For a better overview, FIGS. 4 and 5 merely show a single cut A-B through the marks 104-114. However, the evaluation of the intensity of the image background must be carried out over a number of positions along the circumference of the marks 104-114, for example over a multiplicity of radial cuts through each mark 104-114; in this case, at least two cuts offset by 90 degrees in relation to one another are required for the meaningful evaluation of the background intensity.

An evaluation of the background intensity, in which the evaluation of the background intensity is carried out not only at individual points or cuts at the circumference of the marks, but in which the latter are imaged and evaluated continuously (e.g. by way of mathematical functions), is ideal.

Figure 6:
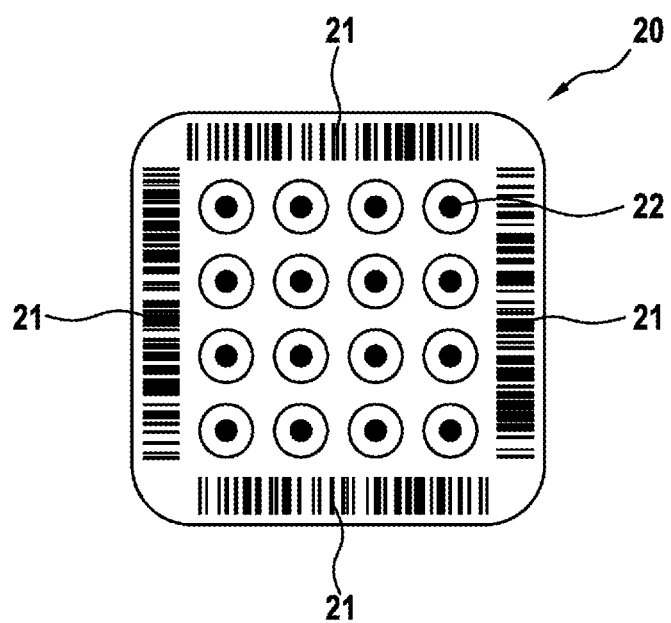
FIG. 6 shows a plan view of an exemplary embodimen of a measurement board according to the disclosure.

FIG. 6 shows an example for a measurement board 20 with an optically pronounced boundary 21. In the example shown in FIG. 6, the optically pronounced boundary 21 is embodied as a barcode and it can transmit additional information in this manner and, in particular, uniquely identify the measurement board 20. However, the optically pronounced boundary 21 can also be embodied as a simple line or a simple pattern, which does not contain any additional information.

An optically pronounced boundary 21 of the measurement board 20 makes it easier for the algorithm for evaluating the images recorded by the at least one measurement device 30 to uniquely identify the measurement board 20 within the image.

The invention claimed is:
1. A device for measuring a vehicle, comprising:
at least one measuring device including at least one image recording device configured to record images, the recorded images containing an image of at least one mark which has a fixed geometric relationship to a wheel of the vehicle; and
an evaluation unit configured to detect a position of the at least one mark, the evaluation unit being further configured to:

receive a recorded image from the at least one measuring device;
identify a location for at least one mark in the recorded image based on a maximum image intensity peak in the recorded image;
identify a gradient of image intensity data in a background region of the recorded image that is adjacent to the at least one mark; and
use the identified location of the at least one mark to identify a position of the wheel only in response to the gradient in the background region of the recorded image being less than a predetermined threshold.

2. The device as claimed in claim 1, further comprising:
at least one optical projection device configured to project the at least one mark onto the vehicle.

3. The device as claimed in claim 1, further comprising:
at least one measurement board assemblable at the wheel of the vehicle, wherein the at least one mark is formed on the at least one measurement board.

4. The device as claimed in claim 3, wherein the at least one mark on the at least one measurement board is embodied in at least one of a matte diffusely reflecting color and a matte diffusely reflecting surface structure.

5. The device as claimed in claim 1, wherein the at least one mark has an optically pronounced boundary.

6. The device as claimed in claim 1, wherein the evaluation unit is configured not to take images of the at least one mark, the background region of which images surrounding the at least one mark has an inhomogeneous illumination intensity, into account in the evaluation of the illumination intensity of the background region.

7. A method for measuring vehicles, comprising:
generating a recorded image of at least one mark which has a fixed geometric relationship to one wheel of a vehicle;
identifying a location for at least one mark in the recorded image based on a maximum image intensity peak in the recorded image;
identifying a gradient of image intensity data in a background region of the recorded image that is adjacent to the at least one mark; and
using the identified location of the at least one mark to identify a position of the wheel only in response to the gradient in the background region of the recorded image being less than a predetermined threshold.

8. The method as claimed in claim 7, wherein the recording of images comprises:
analyzing an illumination intensity of at least one first recorded image;
recording at least one further image; and
adapting an exposure time and/or stop in such a way that when recording at least one further image that the greatest possible number of marks is visible in the further recorded image.

9. The method as claimed in claim 7, further comprising:
optically projecting the at least one mark onto at least one wheel of the vehicle.

10. The method as claimed in claim 7, further comprising:
assembling at least one measurement board, on which the at least one mark is embodied, at the least one wheel of the vehicle.

11. The method as claimed in claim 7, further comprising:
not taking into account images of the at least one mark, the surrounding region of which in each case has an inhomogeneous illumination intensity, in the identification of the gradient in the background region.

12. The method as claimed in claim 7, further comprising:
establishing an angular position of the wheel of the vehicle.

13. The device as claimed in claim 1, wherein the device is configured to establish an angular position of at least the wheel of the vehicle.

14. The device as claimed in claim 2, wherein the at least one optical projection device is configured to project the at least one mark onto at least the wheel of the vehicle.

* * * * *